(12) United States Patent
Murakami et al.

(10) Patent No.: US 6,483,929 B1
(45) Date of Patent: Nov. 19, 2002

(54) METHOD AND APPARATUS FOR HISTOLOGICAL AND PHYSIOLOGICAL BIOMETRIC OPERATION AND AUTHENTICATION

(75) Inventors: Rick V. Murakami, No. Ogden, UT (US); Matthew W. Pettit, Mt. Green, UT (US)

(73) Assignee: Tarian LLC, Salt Lake City, UT (US)

(*) Notice: Subject to any disclaimer, the term of this patent is extended or adjusted under 35 U.S.C. 154(b) by 0 days.

(21) Appl. No.: 09/642,459

(22) Filed: Aug. 18, 2000

Related U.S. Application Data
(60) Provisional application No. 60/210,270, filed on Jun. 8, 2000.

(51) Int. Cl.⁷ .................................................. G06K 9/00
(52) U.S. Cl. ...................... 382/115; 382/116; 340/5.83
(58) Field of Search ................................. 382/115, 116, 382/117, 118, 124–125, 128; 600/26; 340/5.81–5.83; 356/71; 235/382

(56) References Cited

U.S. PATENT DOCUMENTS

| | | | |
|---|---|---|---|
| 4,537,484 A | 8/1985 | Fowler et al. ............... 354/62 |
| 4,544,267 A | 10/1985 | Schiller ..................... 356/71 |
| 4,699,149 A | 10/1987 | Rice ......................... 128/664 |
| 4,728,186 A | 3/1988 | Eguchi et al. ............... 356/71 |
| 4,784,484 A | 11/1988 | Jensen ....................... 356/71 |
| 5,073,950 A | 12/1991 | Colbert et al. ............... 382/2 |
| 5,077,803 A | 12/1991 | Kato et al. .................. 382/4 |
| 5,088,817 A | 2/1992 | Igaki et al. ................. 356/71 |
| 5,103,486 A | 4/1992 | Grippi ....................... 382/4 |
| 5,230,025 A | 7/1993 | Fishbine et al. .............. 382/4 |
| 5,335,288 A | 8/1994 | Faulkner ..................... 382/4 |
| 5,623,552 A | 4/1997 | Lane ......................... 382/124 |
| 5,666,400 A | 9/1997 | McAllister et al. ............ 379/67 |
| 5,719,950 A | 2/1998 | Osten et al. ................. 382/115 |
| 5,737,439 A * | 4/1998 | Lapsley et al. ............... 382/115 |
| 5,774,571 A | 6/1998 | Marshall ..................... 382/119 |
| 5,787,187 A * | 7/1998 | Bouchard et al. .............. 382/115 |
| 5,987,232 A | 11/1999 | Tabuki ....................... 395/187.01 |
| 6,104,913 A | 8/2000 | McAllister ................... 455/41 |
| 6,104,922 A | 8/2000 | Baumann ...................... 455/410 |
| 6,148,094 A | 11/2000 | Kinsella ..................... 382/124 |
| 6,164,403 A | 12/2000 | Wuidart ...................... 180/287 |
| 6,171,112 B1 | 1/2001 | Clark et al. ................. 434/322 |
| 6,182,892 B1 | 2/2001 | Angelo et al. ................ 235/380 |
| 6,193,153 B1 | 2/2001 | Lambert ...................... 235/380 |
| 6,202,151 B1 | 3/2001 | Musgrave et al. .............. 713/186 |
| 6,208,264 B1 | 3/2001 | Bradney et al. ............... 340/825.31 |
| 6,225,890 B1 | 5/2001 | Murphy ....................... 340/426 |
| 6,232,874 B1 | 5/2001 | Murphy ....................... 340/426 |
| 6,269,348 B1 | 7/2001 | Pare, Jr. et al. ............. 705/39 |
| 6,275,806 B1 | 8/2001 | Pertrushin ................... 704/272 |
| 6,289,453 B1 | 9/2001 | Walker et al. ................ 713/175 |

FOREIGN PATENT DOCUMENTS

JP  2000--181871  6/2000

* cited by examiner

Primary Examiner—Bhavesh Mehta
(74) Attorney, Agent, or Firm—Kirton & McConkie; Michael F. Krieger

(57) ABSTRACT

The present invention is directed toward a device for biometric authentication. The device comprises an infra red signal transmitter, signal receiver, memory module, and processing module. The signal transmitter transmits infrared energy toward a user. The infrared energy is partly absorbed and partly reflected by the user's body. The infra red signal receiver collects partly reflected infrared energy. The memory module stores the data, and the processing module processes and compares the reflected infrared energy and stored data for use in biometric authentication.

13 Claims, 5 Drawing Sheets

METHOD AND APPARATUS FOR HISTOLOGICAL AND PHYSIOLOGICAL BIOMETRIC OPERATION AND AUTHENTICATION

RELATED APPLICATION

This application claims priority to the United States Provisional Application No. 60/210,270, Jun. 8, 2000, titled "METHOD AND APPARATUS FOR HISTOLOGICAL AND PHYSIOLOGICAL BIOMETRIC OPERATION AND AUTHENTICATION."

FIELD OF THE INVENTION

The present invention relates to a method and apparatus for activating a device or authenticating a participant in a transaction using histological and/or physiological traits. More specifically, the present invention relates to methods and apparatus employing histological and physiological biometric markers that are substantially unique to an individual in order to permit an individual to activate a device, participate in a transaction, or identify him or herself.

THE BACKGROUND ART

The computer industry has recognized a growing need for sophisticated security systems for computer and electronic devices. The security systems prevent unauthorized use and authenticate or identify individuals through electronic means. The biometric authentication industry has developed in response to this need. Biometrics is the measurement of quantifiable biological traits. Certain biological traits, such as the unique characteristics of each person's fingerprint, have been measured and compared and found to be unique or substantially unique for each person. These traits are referred to as biometric markers. The computer and electronics industry is developing identification and authentication means that measure and compare certain biometric markers with the intention of using the markers as biological "keys" or "passwords."

Biometric markers presently used by the industry for authentication and identification include the use of measurements of unique visible features such as fingerprints, hand and face geometry, and retinal and iris patterns, as well as the measurement of unique behavioral responses such as the recognition of vocal patterns and the analysis of hand movements. The use of each of these biometric markers requires a device to make the biological measurement and process it in electronic form. The device may measure and compare the unique spacing of the features of a person's face or hand and compare the measured value with a value stored in the device's memory. Where the values match, the person is identified or authorized.

Several types of technologies are used in biometric identification of superficial anatomical traits. For example, biometric fingerprint identification systems may require the individual being identified to place their finger on a visual scanner. The scanner reflects light off of the person's finger and records the way the light is reflected off of the ridges that make up the fingerprint. Hand and face identification systems use scanners or cameras to detect the relative anatomical structure and geometry of the person's face or hand. Different technologies are used for biometric authentication using the person's eye. For retinal scans, a person will place their eye close to or upon a retinal scanning device. The scanning device will scan the retina to form an electronic version of the unique blood vessel pattern in the retina. An iris scan records the unique contrasting patterns of a person's iris.

Still other types of technologies are used for biometric identification of behavioral traits. Voice recognition systems generally use a telephone or microphone to record the voice pattern of the user received. Usually the user will repeat a standard phrase, and the device compares the measured voice pattern to a voice pattern stored in the system. Signature authentication is a more sophisticated approach to the universal use of signatures as authentication. Biometric signature verification not only makes a record of the pattern of the contact between the writing utensil and the recording device, but also measures and records speed and pressure applied in the process of writing.

Each of the prior art systems has a number of disadvantages. For example, fingerprint data bases may raise significant privacy issues for those whose information is entered in the system. Hand and facial geometry recognition systems may require large scanners and/or expensive cameras. Voice recognition devices have problems screening out background noise. Signature recognition devices are subject to variations in the behavior of the individual. Retinal devices may require users to place their eye close to or on a scanning device, exposing the user to potential infection.

Another disadvantage of the prior art to biometric authentication is the limited number of biometric markers that are unique to each individual and that are practical for implementing in computer and electronic devices. Because the biometric patterns used in the prior art to authenticate a person are potentially completely unique to each person, the differences that distinguish one person from another person may be subtle. It may require a high degree of electronic sophistication to read and differentiate between the various unique aspects of the biometric marker. If the biometric marker is used to identify an individual from a large group of individuals, the computer memory storage and processing capability may also have to be sophisticated, and therefore, may be expensive.

Another disadvantage of prior art is that with relatively few truly unique biometric markers, it is likely that use of those markers, such as a fingerprint, would be widespread. The widespread use of just one or two types of markers increases the likelihood that an unauthorized person could, by chance or otherwise, be improperly granted access. If an unauthorized person were improperly given access, that individual may have access to numerous secured devices or accounts. This is the same problem that exists when a person chooses the same password for all his accounts or electronic devices.

U.S. Pat. No. 4,537,484 to Fowler et al. discloses a fingerprint imaging apparatus for use in an identity verification system. The system uses light, which is reflected off the finger through a system of mirrors to a linear photo diode ray. The fingers rotated mechanically in order to scan the entire fingerprint.

U.S. Pat. No. 4,544,267 to Shore discloses an identification device that uses a beam of collimated light to scan the fingerprint. The light beam is then imaged onto a linear ray of photo-responsive devices. The information is processed to provide a set of signals containing fingerprint information.

U.S. Pat. No. 4,699,149 to Rice discloses a device for detecting the position of subcutaneous blood vessels such as by using the reflection of incident radiation off of a user's skin. The measured pattern is then compared with a previously determined pattern to verify the identity of the user.

U.S. Pat. No. 4,728,186 to Eguchi et al. discloses another method for detecting data an uneven surface such as a finger, namely a fingerprint, using a light source illuminating the uneven surface through a transparent plate.

U.S. Pat. No. 4,784,484 to Jensen discloses an apparatus for automatic scanning of a fingerprint using an optical scanner. The user slides his finger across a scanning surface and an optical scanning system generates an electrical signal as a function of the movement of the finger across the optical scanning surface.

U.S. Pat. No. 5,073,950 to Colbert et al. discloses a method and apparatus for authenticating and verifying the identity of an individual based on the profile of a hand print using an optical scanner.

U.S. Pat. No. 5,077,803 to Kito et al. discloses a fingerprint collating system employing a biological detecting system.

U.S. Pat. No. 5,088,817 discloses an apparatus for detecting and identifying a biological object by projecting a light beam onto the object and detecting the reflective light using an optical detector. The change in the wave length characteristics of the light beam can be compared to a previously determined pattern.

U.S. Pat. No. 5,230,025 discloses a system for generating data characteristics of a rolled skin print using an optical device that can convert reflective light beams into an electronic signal and generate digital data representative of the image of the skin print.

U.S. Pat. No. 5,335,288 to Faulkner discloses a biometric measuring apparatus that uses silhouette and light images to measure a person's hand features. The features are converted to electronic data and stored and later compared for identification purposes.

Some biometric authentication systems combine biometric measurements with conditions behavior such as signature writing styles and voice patterns or intonations. For example, U.S. Pat. No. 5,103,486 to Grippey discloses a signature verification system utilizing a hand held writing implement that produces data regarding a person's fingerprint pattern and their hand written signature.

Other biometric authentication systems include means for verifying physiological activity. These means for verifying physiological activity are primarily to prevent an unauthorized person from using dead tissues as a means for circumventing the authentication process. For example, U.S. Pat. No. 5,719,950 to Osten et al. discloses a personal biometric authentication system wherein inherently specific biometric parameters are measured and recognized and at least one non-specific biometric parameter is recognized and compared with physiological norms. Likewise, U.S. Pat. No. 5,727,439 to Lapsley et al. discloses an antifraud biometric scanner that determines whether blood flow is taking place in the object being scanned and whether such blood flow is consistent with that of a living human.

It would therefore be advantageous to provide a method and apparatus for biometric authentication and activation that does not exclusively rely upon the measurement of superficial anatomical structure and/or behavioral responses. It would also be advantageous to provide a biometric authentication system that is relatively inexpensive and portable. It would be a further advantage to provide a biometric authentication system that can use but does not require the use of truly unique biometric markers. It would also be advantageous to provide a method and apparatus for biometric authentication that can use a single technology to measure multiple, varied biometric markers.

BRIEF SUMMARY AND OBJECTS OF THE INVENTION

The present invention provides a method and apparatus for identification and authentication using physiological and histological biometric markers. The biometric markers of the present invention are substantially unique to each person, but not necessarily totally unique. The biometric markers of the present invention are not merely measurements of superficial anatomical structure or behavioral traits, but instead utilize or alternatively include measurements of physiological traits of the various systems of the human body and/or are histological traits associated with tissues of the human body. The present invention also contemplates the use of internal biometric markers that are not representative of any particular traits but are a composite of various physiological and/or histological traits. While the biometric markers of the present invention may be entirely unique to each person, markers that are not entirely unique but that are substantially unique may be used in the authentication process. In using substantially unique biometric markers, the present invention also allows a wide variety of biometric characteristics to be employed in a relatively compact and inexpensive device. The present invention employs biological markers that are substantially unique that remain relatively consistent from measurement to measurement and that preferably are capable of being measured without physically invasive procedures.

The present invention provides for the use of a layering technique. The layering technique can enhance the security capabilities of the present invention. Layering is a technique, which employs the use of more than one biometric marker for authentication. Where multiple biometric markers are used to authenticate a transaction, the odds that an unauthorized individual will replicate the authorized person's biometric profile may decrease with the addition of another biometric characteristic to the authentication process.

The present invention may also avoid some of the privacy issues and other disadvantages associated with prior art biometric markers by employing unique physiological or histological biometric markers. For example, use of a physiological marker such as arterial blood pressure is less likely to raise the types of privacy issues associated with the use of fingerprints, does not require expensive scanning equipment, is not subject to behavioral variability, and does not raise issues of undesirable and potentially infectious contact with sensitive tissues.

The use of physiological and histological markers allows the devices in which such a biometric system is used to be both secure and readily manufactured and marketable. Because of the variety of ways in which the physiological markers can be measured and the variety of markers that can be used in the system, the present invention allows for greater flexibility and variability in the design of the device. Prior art systems rely upon the measurement of superficial anatomical structure thereby limiting the application of the associated system. For example, it is in many circumstances financially and technologically impractical to develop a facial or hand recognition system for portable devices such as laptops or PDAs. Contrary to the current trend in the biometric industry, the present invention does not limit the types of markers used to superficial anatomical structure or complex behavioral activity and thus expands the potential applications.

The present invention provides for the use of histological traits of various human tissues. Various kinds of human tissue, such as epithelial tissue, connective tissue, muscle tissue, and nervous tissue, have characteristics which are substantially unique to each person. For example, the depth of the various layers of epithelial tissue from a given point on the skin surface may be a substantially unique histological trait that can be used as a biometric marker. The density of a particular kind of connective tissue, such as bone density, may be a substantially unique histological trait that can be employed in a biometric authentication system. Likewise, the light absorption characteristics of muscle tissue could be a substantially unique histological trait as could the electrical resistance of nervous tissue. The examples given, which are hypothetical and are not intended to be limiting, demonstrate that histologically based biometric markers provide advantages not found in the prior art and in particular, can be used to improve security and increase the variety of applications for which biometric markers are used.

In the same way that histological markers increase both the marketability and security of biometric systems, physiologically based biometric markers also provide advantages for the present invention. Physiological markers do not require the scanning or mapping of anatomical structure. Neither do they require the analysis of volitional acts, as are required with voice or signature analysis. Physiological markers are based upon nonvolitional, physiological processes and phenomenon that occur in the body. These markers include physiological processes associated with, but not limited to the (integumentary) system, the skeletal system, the muscular system, the pulmonary system, the respiratory system, the circulatory system, the sensory system, the nervous system, the digestive system, the urinary system, the endocrine system, and the reproductive system. Included in the physiological biometric markers are those activities associated with the various physiological systems that occur automatically or, in other words, are non-volitional. All of these systems and related subsystems provide traits that can be measured in a variety of ways to provide substantially unique biometric markers for the present invention.

Physiological and histological biometric markers may be measured in common units such as spacial measurements of length, area, and volume. Frequency is also another type of measurement that can be practically applied to histological and physiological biometric markers. However, the present invention provides for the monitoring of biometric markers in a variety of other additional ways. The relative motion of particles and fluids can be measured in terms of velocity, acceleration, volumetric flow rate or angular velocity, and angular acceleration. Physical interaction such as force, surface tension, pressure, viscosity, work, and torque are other possible measurements. The physiological and histological markers may also be based upon energy or heat related characteristics such as power, heat quantity, heat flux, volumetric heat release, heat transfer coefficient, heat capacity, and thermal conductivity. Likewise, measurements, such as electric quantity, electromotive force, electric field strength, electric resistance, and electrical capacities, could provide biometric markers, depending upon the tissue or physiological process being monitored. Magnetic related characteristics, such as magnetic flux, induce, magnetic permeability, magnetic flux density, magnetic field strength, and magneto-motive force could be used. Other potential measurements may include luminous flux, luminance, illumination, radio nucleotide activity, radioactivity, temperature, and absorbed dose and dose equivalent, and amount of substance (mole).

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

Figure 1:
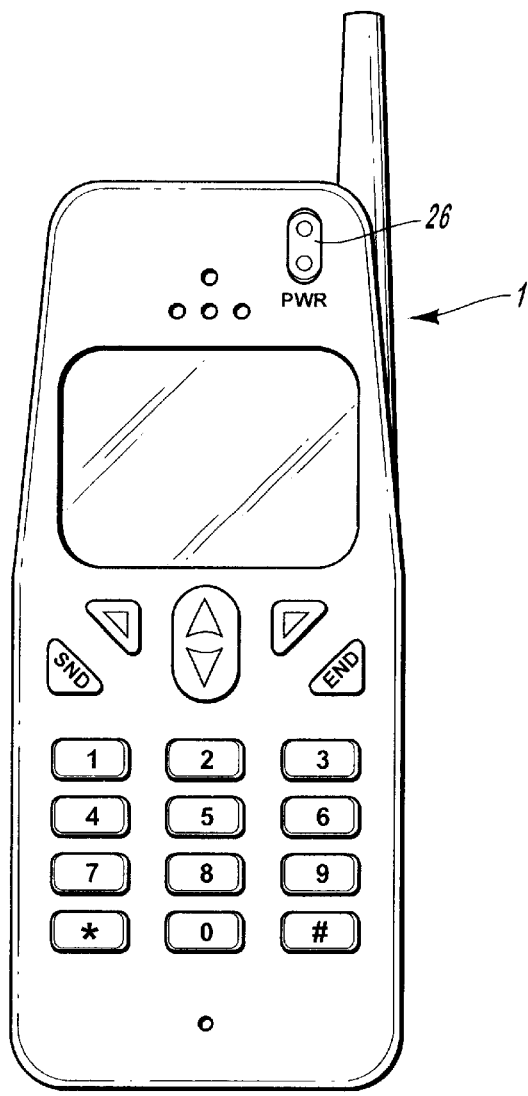
FIG. 1 illustrates a front view of an electronic appliance having a biometric authentication device disposed within.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 7, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

The present invention describes a method and system for biometric access and authentication using histological and physiological traits.

In a preferred embodiment of the present invention, a biometric marker related to the circulatory system is used to provide authentication and security for a device for transaction. In one preferred embodiment, an infrared light is directed toward a specific part of a user's body, preferably the user's finger. The infrared light penetrates the skin of the finger and is absorbed or reflected off the user's skin and subskin tissues and, specifically, arterial tissues. The reflected light is then received by the system and converted into an electronic signal, which can then be stored in some electronic format.

The changing pressure within the artery or arteries being monitored can be described and analyzed as a hemodynamic waveform. The arterial pressure fluctuates as a result of the cardiac cycle. As the heart's atrium ventricles contract and relax (undergo systole and diastole), pressure in the arterial blood vessels correspondingly rises and falls in a wave-like manner. This pressure waveform has distinct characteristics that result from the timing of systole and diastole and the opening and closing of the cardiac valves. The waveform of one preferred embodiment may be a composite waveform reflecting events in the cardiac cycle, for example: peak systolic pressure, the dicrotic notch, diastolic pressure, the anacrotic notch, and potentially pulse pressure.

In the cardiac cycle, when the right ventricle begins to contract and the pressure in the right ventricle builds, the pulmonic valve opens and blood is passed from the right ventricle into the pulmonary artery, and the pressure in the pulmonary artery naturally increases. As the right ventricle begins to relax, pressure in the pulmonary artery begins to drop. When the pressure in the ventricle declines sufficiently, the pulmonic valve closes and diastole begins. When the pulmonic valve closes, the decline in pressure, as reflected in the waveform, is interrupted by a brief upward movement in the waveform. This interruption is referred to as a dicrotic notch.

Likewise, a dicrotic notch is seen in connection with the aortic valve. When the aortic valve of the heart opens, arterial pressure quickly increases. The arterial pressure increase is the result of the blood flowing out of the left ventricle and into the aorta and arteries. Pressure in the aorta and arterial system continues to rise as blood flows from the left ventricle. As the ventricle completes the contraction, pressure in the aorta begins to decrease and diastole begins. When the aortic valve closes, pressure in the aorta increases temporarily. The closing of the valve and temporary increase in pressure can be seen in graphs of waveforms as a "dicrotic notch."

In the same way the dicrotic notch marks the closing of the pulmonary and aortic valves, the anacrotic notch marks the opening of the aortic valve. As the ventricles enter the systole phase, the rising pressure in the aorta decreases momentarily as a results about the time the aortic valve opens. In the waveform this event is called the anacrotic notch and occurs at the opening of the aortic valve. This notch is generally visible only in central aortic pressure monitoring or in some pathological conditions such as arterial stenosis.

Dicrotic and anacrotic notches reflect the brief change in the waveform that occurs as a result of the opening and closing of the pulmonary and aortic valves. The timing and magnitude of the dicrotic and anacrotic notch is a relatively consistent and substantially unique cardiovascular trait for each person. In the present invention, by monitoring the arterial pressure with an infrared light, a consistent and substantially unique individualized wave pattern can be generated based on the hemodynamic waveform, and in particular, the dicrotic and/or anacrotic notch.

Vasoconstriction of the arteries results in a diastolic pressure. During the period of diastole, blood moves through the larger arteries into smaller arterial branches. The movement of the blood during diastole (such as from the larger to smaller branches) creates some pressure in the arterial system. This pressure is known as diastolic pressure.

Pulse pressure may also be a component of the waveform of the present invention. Pulse pressure represents the difference between the systolic and diastolic pressure. Stroke volume and vascular compliance may also be reflected in the composite wave of the present invention.

In this preferred embodiment of the present invention, the waveform of a user is initially measured and stored in an electronic form. The stored waveform can then be compared to subsequent measured waveforms and, based upon the similarities of the stored waveform and measured waveform, grant or deny access to a device or authorization for transaction. A circulatory biometric marker may be combined with at least one other biometric marker associated with the circulatory system or with another physiological system or histological trait. By "layering" the circulatory biometric marker with at least one other marker, the present invention increases the security of the present invention. In one example of the present invention an electronic apparatus employees and internal biometric marker that is not representative of a particular physiological or anatomical trait.

The means for measuring, recording, and storing the biometric markers employed in the present invention may be any suitable means known in the art. For example, measurement means using absorbed or deflected light rays, and electrical impulses. Means for measuring may include devices capable of measuring pressure differentials, temperature changes, movement, distance, frequency, magnetics, physical interactions, luminescence and radioactivity.

One embodiment of the present invention comprises a signal transmitter and a signal receiver. The signal transmitter transmits energy into dermal and subdermal tissues of the user of a biometric authentication device. The energy transmitted is partly absorbed into the tissues and partly reflected by the tissues. The signal receiver captures the reflected energy and measures the received signal to create a signal profile that represents the absorption and reflection of the signal. The signal data may be collected over any length of time reasonable for authentication purposes. At least one aspect of the data received represents a constant and repeatable characteristic of the signal as absorbed and reflected by the tissues. Furthermore, at least one of the constant and repeatable characteristics is a characteristic that is substantially unique to each person. The resulting constant, repeatable, and substantially unique measurement can be used as a biometric identifier. In one preferred embodiment of a biometric authentication device of the present invention, the signal transmitter emits infrared energy, which is absorbed and reflected by dermal and subdermal layers of a user of the biometric authentication device. The signal transmitter may be an infrared transmitter, such as a light emitting diode, which directs energy into the finger of the user of the biometric authentication device. One embodiment of the present invention is represented by schematic of FIG. 6. The IR transmitter transmits at a high energy audio frequency, and is preferably in close proximity to the user's dermal and subdermal tissues. For example, the user may put the user's finger over the light emitting diode in order for the infra red energy to be transmitted into dermal and subdermal tissues and therein be partly absorbed and partly reflected.

The amount of infrared energy that is reflected or absorbed will be partly dependent upon and partly modulated by the anatomical structures and physiological processes taking place within the tissues. Because the anatomical structure and physiological processes of each person will be slightly different, the reflected energy received by the signal receiver will vary from person to person. These structures and processes will uniquely modify the amount of the energy that is absorbed and the amount that is reflected. Many of the structural and physiological differences between individuals will directly affect the absorption and reflection of the energy while others will indirectly affect absorption and reflection. Arterial wall strength, which may vary from individual to individual, creates resistance to blood flow and may affect the timing of the cardiac cycle. Thus, the specific arterial wall strength of an individual user may, because of the structure of the material wall, uniquely modify the signal or, may because of its influence on the flow of blood through the arteries, likewise modify the amount of signal absorbed and the amount reflected. In the case of infrared absorption and reflection of the preferred embodiment, the amount of infrared energy returning to the signal receiver will be modified or modulated by the user's anatomy, such as his or her bone structure, and by physiological processes, such as the user's blood flow. When infrared energy is absorbed and/or reflected by dermal and subdermal tissues, the reflected energy may represent the combined effect of anatomical structures and physiological processes. Thus, the energy received by the signal receiver of the preferred embodiment may be a composite signal that reflects more than just one anatomical structure or physiological process.

Figure 7:
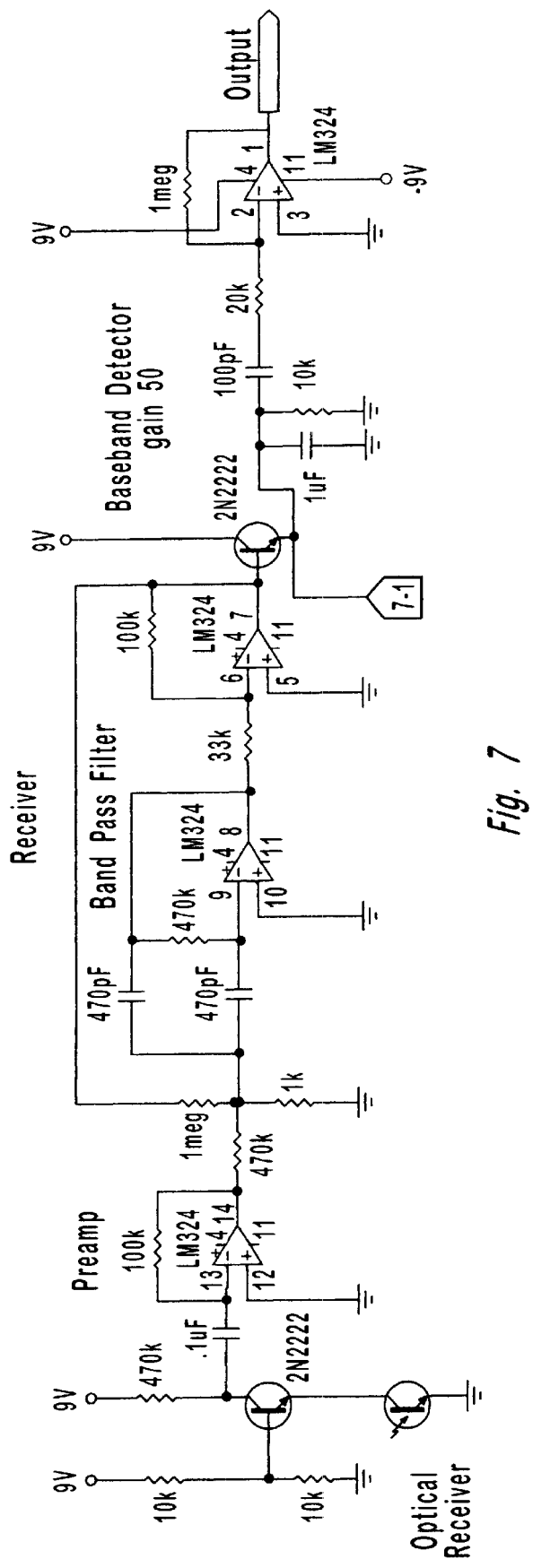
FIG. 7 illustrates a schematic diagram of one embodiment of a receiver of present invention.

In one preferred embodiment of the present invention, the signal receiver is an infrared photo receptor, which receives the infrared energy reflected back from the dermal and subdermal tissues as shown in FIG. 7. Biasing techniques, such as biasing transistors, may provide for better reception of the infrared energy signal.

The signal received by the infrared photo receptor is processed, for example, by a processing module, in order for the signal to be stored and used as a biometric identifier. In the preferred embodiment, the photoreceptor receives energy preferably transmitted at high energy audio frequency and conducts this energy signal through a band pass filter, which filters out high and low frequency components of the signal. The signal may be "decreased" using a baseband filter and a low pass filter. Thus processed, the signal is ready to be digitized into a preferable waveform. After being digitized, the signal, now in digital waveform, can be further filtered. Outside noise, such as might be present from electric outlets or electrical appliances, can be filtered out and the final digital waveform may be saved. The stored digital waveform will provide the basis for biometric identification.

In a preferred embodiment the signal may be modulated at a higher frequency and then brought back down to a lower base band frequency, which allows the infrared energy to radiate at less power. After the signal is transmitted, the signal can be captured and the low frequency noise filtered out. It is a unique advantage of one embodiment of the present invention to filter out background noise by transmitting the signal that is to be used for biometric identification at a relatively high frequency. The final waveform is stored in a memory module and may represent a composite waveform reflecting anatomical structure and physiological processes, such as blood flow, heart rate, blood pressure, and surrounding bone and blood vessel structure.

The waveform may itself represent a unique biometric marker or may, through a process of layering or applying algorithms to the waveform, yield characteristics substantially unique to each individual and which are constant and repeatable. Some waveforms may need to be "dissected" in order to analyze the various components of the waveform and properly compare waveforms of different users to provide authentication. In the preferred embodiment, the waveform is primarily associated with cardiovascular processes in the body, however, the waveform could represent any one or more of the body's internal physiological processes or anatomical structures.

Anticipating that the physiological and anatomical attributes of a user of the present invention will change over time, the present invention provides for a method of self-calibration. Self-calibration allows the stored, authenticating signal or waveform to be modified to coincide with the changes in the user's physiological and anatomical attributes over time. For example, if the authentication system involves monitoring cardiovascular function, the user's heart function changes with time and the signal received from the authorized user may also slightly change over time. Thus, the authorized user's signal may be slightly different from the originally stored, authenticating signal.

In order to allow for the changes that occur in the user's body, the authentication program of the present invention provides for some degree of variance between the stored, authenticating waveform and an authorized user's waveform. The program can track such variances over time and modify the stored authenticating waveform to more closely match the slightly changed waveform of the authorized user, if necessary. Self-calibration allows the authenticating signal to be modified within a statistical limit, to more closely match a gradually changing waveform of an authorized user. Thus, as small and insubstantial changes in the authorized user's waveform increase over time, the authenticating signal can also be changed. Self-calibration may be applied by the use of a calibration program and is preferably an automatic and continuous calibration that is performed upon each use of the authentication device.

When a received signal is compared to an authenticating signal, if the signals or waveforms are statistically identical, the present invention will transmit a validating signal, which may activate a switch or otherwise enable a device. Where the signals or waveforms are not statistically identical, a signal indicating the waveform is "invalid" is generated. When the signal is not valid, the biometrically activated switch will remain off or the device will remain disabled.

In one preferred embodiment, the signal transmitter and the signal receiver constitute an infrared light emitting diode placed in an on/off button for a biometrically activated device. The signal receiver can be a photoreceptor connected to a single chip solution and integrated into PCA of a portable electronic device. The photoreceptor may be located in the same plane as the LED and may be positioned relatively near to the transmitter. For example, in one embodiment, the photoreceptor is embedded in the same on/off button as the LED and is approximately a quarter inch away from the LED.

Figure 2:
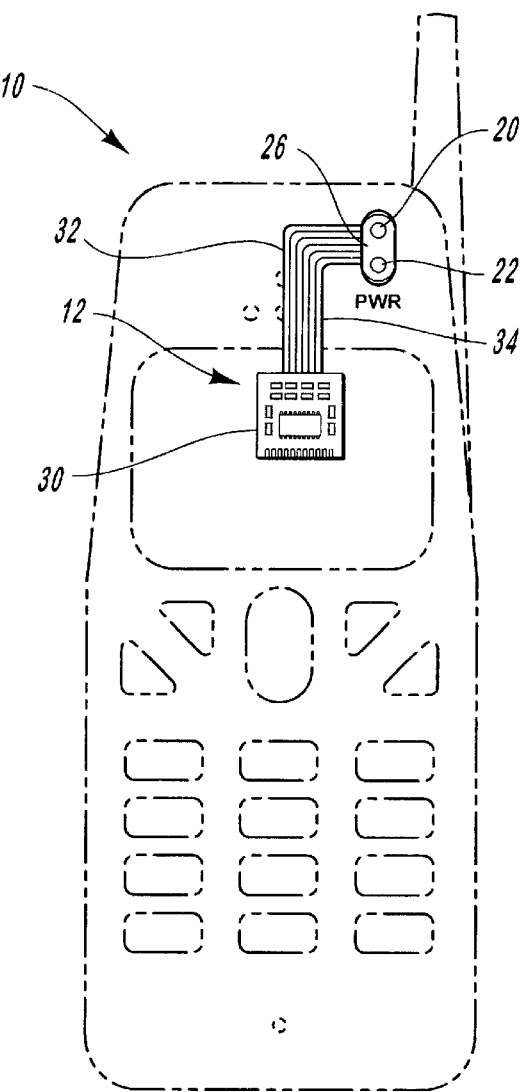
FIG. 2 illustrates a transparent front view of the electronic appliance of FIG. 1 revealing the biometric authentication device.

FIG. 1 illustrates an electronic appliance 10 having a biometric authentication device 12. A biometric authentication device comprises a button 26 or switch 26 for enabling the electronic appliance 10, in this case as mobile phone. The biometric authentication device 12 is incorporated into the power button 26 of the phone so that the signal transmitter 20 and the signal receiver 22 are in the same plane and are proximate to each other. FIG. 2 shows the biometric authentication device 12 being connected to a single chip 30 that is integrated into the PCA of the phone 10. The signal transmitter 20 is connected to the chip 30 through transmitter wires 32 and the signal receiver is connected to the chip through receiver wires 34.

The signal transmitter 20 can be any transmitter known or used in the art capable of transmitting energy into dermal and subdermal layers such that the energy signal is partly absorbed and/or partly reflected back toward the signal receiver 22. The signal receiver 22 can likewise be any device capable of receiving the partly reflected signal. In the preferred embodiment of the present invention, as shown in FIG. 2, the preferred signal transmitter 20 is an infrared light emitting diode and the preferred signal receiver 26 is a photoreceptor.

Figure 3:
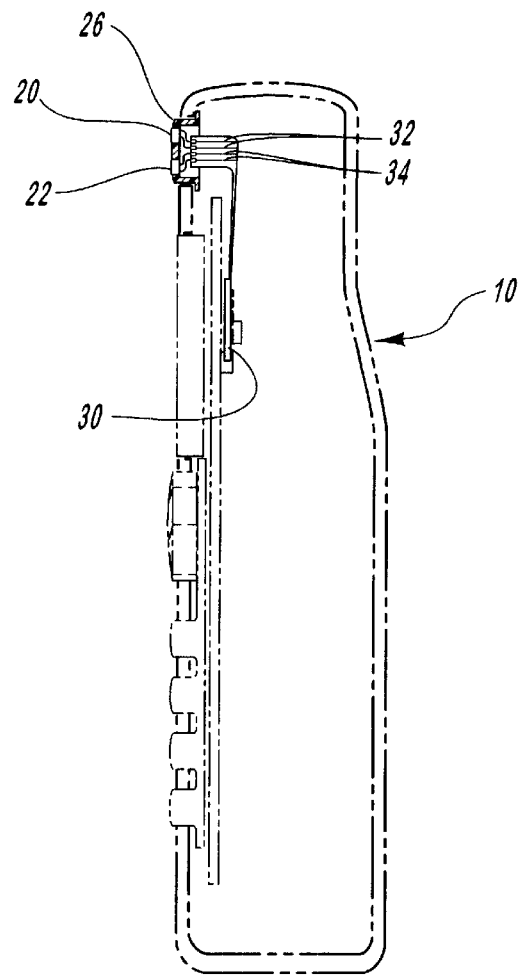
FIG. 3 illustrates a cut away side view of the embodiment of FIG. 1.

FIG. 3 shows a side view of the present invention with a signal receiver 20 and a signal transmitter 22 being connected to receiver wires 34 and transmitter wires 32 leading to the chip 30. The signal receiver 22 and signal transmitter 30 are embedded in the button 26, which is disposed in the phone 10.

Figure 4:
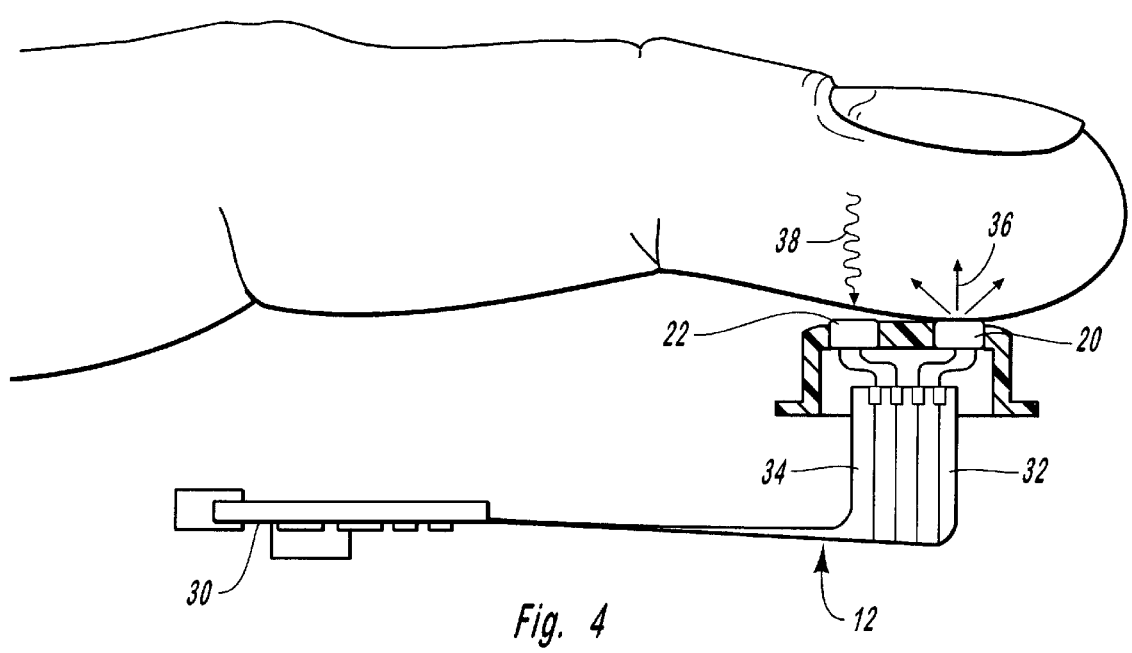
FIG. 4 illustrates a cut away side view of the embodiment of FIG. 1, the electronic appliance is not shown.
Figure 5:
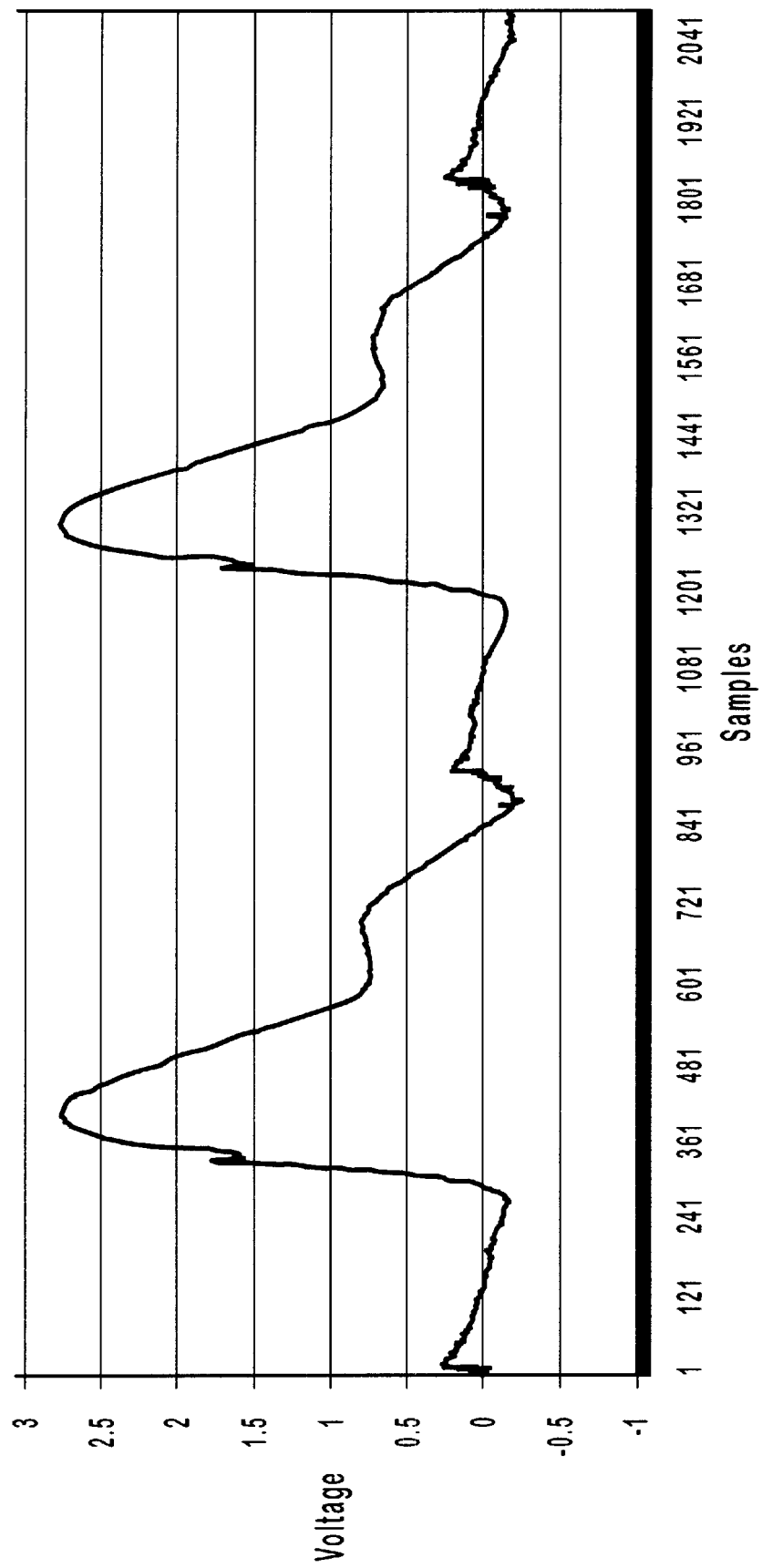
FIG. 5 illustrates a waveform of the present invention capable of use as a biometric marker.
Figure 6:
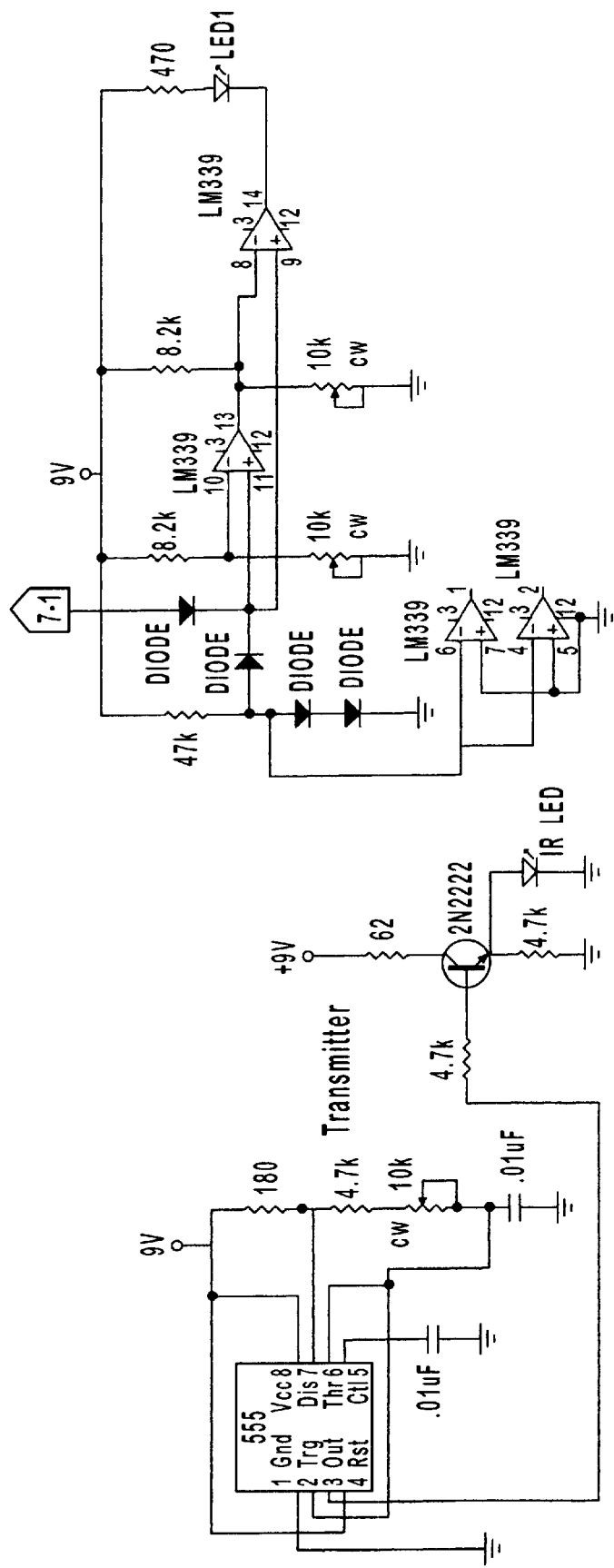
FIG. 6 illustrates a schematic diagram of one embodiment of a transmitter of the present invention.

FIG. 4 illustrates a user's finger absorbing energy from the signal transmitter 20 and receiving reflected energy from the dermal and subdermal tissues of the user's finger in the signal receiver 22.

The signal transmitter 20 is activated by the placement of the finger on the button 26. The signal transmitter 20 is preferably activated when the user places his or her finger on the button 26. The signal transmitter 20 may be activated by pressure from the user's finger, by an optical switch, motion detector, or heat sensor, or any other means for activation. When the signal transmitter 20 is activated, a signal 36 is emitted from the signal transmitter 20 and is transmitted into the user's dermal and subdermal tissues. The signal 36 is partly absorbed and partially reflected by the dermal and subdermal tissues. The reflected signal 38 is received by a signal receiver 22 and transmitted through receiving wires 34 to the chip 30. Within the chip 30, the received signal 38 is processed and transformed into a biometric identifier such as a digital waveform shown in FIG. 5. The biometric identifier is then compared to the stored, authenticating biometric identifier. If the received biometric identifier is the same as the stored, authenticating biometric identifier, the device 10 is enabled.

EXAMPLE 1

In a preferred embodiment of the present invention, a biometric authentication system uses multiple biometric markers for authentication in a transaction. Using an infrared reading device comprising a signal transmitter and a signal receiver both connected to a processing module and a memory module, biometric markers based upon a composite waveform are taken. In alternative embodiments, different cardiovascular related biomarkers are measured. The biometric profile based upon the composite waveform is created and stored in the device. When a user wishes to authenticate his participation in a transaction, the user places his finger on the infrared reading device allowing the system to obtain measurements on the biometric markers. The biometric markers are processed and compared to those stored. Where the biometric markers match the individual is able to authenticate his participation in the transaction.

EXAMPLE 2

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is selected from the traits that are substantially unique. If a trait or measurement taken from one individual has only at least approximately a one in two chance of being the same as the measurement of that same physical trait taken from another person the trait is substantially unique. The trait is also a trait that is substantially consistent when measured for the same person and is preferably capable of being measured in a noninvasive method. The trait is a trait associated with the integumentary system.

Use of the integumentary system in the biometric authentication system of this embodiment provides relatively easy access to the biometric markers, since the integumentary system is relatively superficial as compared to other systems. The integumentary system also provides an effective line of defense against infection. Thus, if a biometric authentication system requires several users to come into contact with the biometric system, the integumentary system acts as a barrier to the passing of infection whereas other tissues may not provide such a barrier. Moreover, the integumentary system provides several layers of integument from which biometric markers can be taken. Glandular activity of the integument and other epidermal derivatives such as hair and nails may also supply biometric markers for use with this exemplary embodiment of the present invention.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. In other words, the stored profile will act as a password, preventing access to the device unless a substantially identical biometric profile is measured by the device. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 3

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is selected from the traits that are substantially unique. The trait is also a trait that is substantially consistent when measured for the same person and is preferably capable of being measured in a noninvasive method. The trait is a trait associated with the skeletal system.

Use of the skeletal system in this embodiment of the present invention provides a relatively stable and relatively unchanging system from which biometric markers can be taken. The variety of tissues and structures and various physiological processes associated with the skeletal system and articulating joints may provide multiple biometric markers with this preferred embodiment. For example, biometric markers related to ligament layering may be found to be effective biometric markers.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 4

In one embodiment of the present invention, a biometric authentication system is s provided to control access or to authenticate. The system comprises electronically recording biometric markers using an electronic recording instrument. The electronic recording instrument measures at least one biometric marker. The measured trait is capable of acting as a biometric marker because it is selected from the traits that are substantially unique, in other words the trait measurement taken from one individual has only at least a one in two chance of being the same as the measurement of that same physical trait taken from another person. The trait is also a trait that is substantially consistent when measured for the same person and is preferably capable of being measured in a noninvasive method. The trait is a trait associated with the muscular system.

Use of the muscular system in this preferred embodiment of a biometric authentication device may provide numerous potential biometric markers because of the highly specific and specialized function of the various muscles in the muscular system. For example, the human hand is an extremely complex portion of the muscle system. This complex system allows for intricate movement of the hand in response to various stimuli. It is believed that substantially unique biometric markers relating to the muscular system, and in particular to the muscular system of the hand, exist. For example, the duration of action potentials and their effect on a particular muscle may be a potential biometric marker that can be used in this preferred embodiment of the present invention.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile.

The device is designed so that before the device is fully activated, the device must measure and compare a user's biometric profile with the authorized biometric profile. If the biometric profile measured is substantially identical to the stored biometric profile, then the user may be granted access to the device.

EXAMPLE 5

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is selected from the traits that are substantially unique. The trait is also a trait that is substantially consistent when measured for the same person and is preferably capable of being measured in a noninvasive method. The trait is a trait associated with the respiratory system.

The respiratory system provides a relatively consistent and systematic physiological process to be monitored, particularly as it relates to pulmonary activity and the supply of oxygen and removal of carbon dioxide from the blood stream. Respiratory activity in many instances can be easily monitored. The inventors believe that there are multiple respiratory characteristics that are substantially unique to each individual and that such characteristics may be employed in a biometric authentication system. For example, measurements relating to $O_2$ and $CO_2$ content in various tissues may be found to be suitable as a biometric marker.

After measuring at least one biometric marker, the marker is recorded electronically and stored to constitute a biometric profile of the person. The information stored as a abiometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 6

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the cardiovascular system.

Because of the remarkable ability of the heart to continually and rhythmatically pump blood through the cardiovascular system, the cardiovascular system provides numerous biometric markers for use in this preferred embodiment. The cardiac cycle alone as explained above in Example 1, undergoes both an electrical and physical phenomena that result in potential biometric markers. The fluid dynamics of the vascular system also provide potential biometric markers.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 7

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the sensory system.

Use of the sensory system as a source for biometric markers provides a number of highly specialized reactions that can be readily tested. This is because the sensory system is specifically designed to receive stimuli from the external environment. For example, the dilatory response of the eye to a certain amount of light may provide a potential biometric marker.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 8

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the nervous system.

Because of the anatomically ubiquitous nature of the nervous system, and its ability to respond to electric stimulus, the nervous system provides a number of biometric markers that may be used in this embodiment. For example, the response of a particular nerve or bundle of nerves to a measured electrical stimulus may provide a biometric marker for use in this embodiment.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 9

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with a metabolic system.

The numerous metabolic processes of the body provide a number of biometric markers for use in the present invention. For example, the ability of certain tissues to absorb or release heat over time and the body's ability generally to control internal temperatures may provide a biometric marker.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, more than one biometric marker is measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 10

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the dicrotic notch and/or anacrotic notch of a person's hemodynamic waveform.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 11

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is substantially unique. The trait is also a trait that is substantially consistent when measured for the same person and is preferably capable of being measured in a noninvasive method. The trait is a trait associated with the anacrotic notch of a person's cardiac waveform.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. The device is designed so that before the device is fully activated, the device must measure and compare a user's biometric profile with the authorized biometric profile. If the biometric profile measured is substantially identical to the stored biometric profile, then the user may be granted access to the device.

EXAMPLE 12

In one embodiment of the present invention, a biometric authentication system is provided to control access or to authenticate. The system comprises electronically recording biometric markers using an electronic recording instrument. The electronic recording instrument measures at least one biometric marker. The measured trait is capable of acting as a biometric marker because it is selected from the traits that are substantially unique, in other words the trait measurement taken from one individual has only at least a one in two chance of being the same as the measurement of that same physical trait taken from another person. The trait is also a trait that is substantially consistent when measured for the same person and is preferably capable of being measured in a noninvasive method. The trait is a trait associated with cardiovascular processes as exhibited in a person's finger.

After measuring at least one biometric marker, the marker is recorded electronically and stored to constitute a biometric profile of the person. The information stored as a biometric profile is preferably stored in the portable device, or is at least available to the portable device upon demand. In the preferred embodiment, other biometric markers are measured and recorded to constitute a multi-marker biometric profile.

The information stored as a biometric profile is then designated as an authenticating profile. In other words, the stored profile will act as a password preventing access to the device unless a substantially identical biometric profile is measured by the device.

The device is designed so that before the device is fully activated, the device must measure and compare a user's biometric profile with the authorized biometric profile. If the biometric profile measured is substantially identical to the stored biometric profile, then the user may be granted access to the device.

EXAMPLE 13

In another example of the present invention, the biometric device is used to grant access to a personal computer or some similar electronic device. In this example, the signal transmitter is built into the keyboard, mouse, tower or monitor of the personal computer. The signal transmitter may be activated by turning on the computer and activating the transmitter the transmitter or the transmitter may itself regulate the power supply to the computer. The signal transmitter sends energy into dermal and subdermal tissues of the user of a biometric authentication device. For example, the user may place his or her finger onto the transmitter located on mouse in which the present invention is disposed. The energy transmitted is partly absorbed into the tissues of the finger and partly reflected by the tissues. The signal receiver then captures the reflected energy and measures the received signal to create a biometric profile.

When the biometric profile matches the authorized biometric profile, the author is granted access to the use the computer, access certain data, or run an application. The storage and processing power of the computer may be utilized to facilitate the biometric identification procedure.

What is claimed is:

1. A method for creating unique, internal, physiological biometric markers comprising:

transmitting a high frequency infrared energy signal toward a user to measure a trait of an internal, nonvolitional physiological process occurring within the user, wherein said trait is unique and inherently specific to the user;

receiving a reflected infrared signal from the transmitted infrared energy; and analyzing said infrared signal to identify at least one trait of said physiological process that is unique to the user.

2. A method as claimed in claim 1 further comprising the step of layering said at least one trait of the reflected signal.

3. A method as claimed in claim 1 further comprising analyzing the reflected signal for repeatability.

4. A method of biometric identification comprising the steps of:

transmitting infrared energy toward a user to measure at least one trait of an internal, nonvolitional physiological process occurring within the user, wherein said trait is unique and inherently specific to said user, said infrared energy being partly absorbed and partly reflected by said user's body;

collecting a portion of said partly reflected infrared energy;

processing said portion of said reflected infrared energy to create a biometric profile based on said trait that is unique to said user;

storing said biometric profile in machine memory to create an authenticating biometric profile; and subsequently determining authentication of the user by employing said authenticating biometric profile and comparing it against a similar profile of an individual seeking authentication.

5. A method for generating biometric markers comprising the steps of:

transmitting infrared energy toward a user to measure at least one trait of an internal physiological process occurring within the user, wherein said trait is unique and inherently specific to said user, said infrared energy being partly absorbed and partly reflected by said user's body;

collecting a portion of said partly reflected infrared energy;

processing said portion of said reflected infrared energy to define at least one biometric marker that is unique to said user.

6. A device for biometric authentication comprising:

an infra red signal transmitter capable of transmitting infrared energy toward a user to measure at least one trait of an internal physiological process, wherein said at least one trait is unique and inherently specific to said user, said infrared energy being partly absorbed and partly reflected by said user's body;

an infra red signal receiver capable of collecting a portion of said partly reflected infrared energy;

a memory module capable of storing data related to said infrared energy collected by said receiver wherein said data are related to said at least one trait of said internal physiological process that is unique to said user; and a processing module capable of processing and comparing said reflected infrared energy and stored data for use in biometric authentication based upon said at least one trait of said internal physiological process.

7. The device of claim 6, wherein said infrared signal transmitter transmits signals into dermal and subdermal tissues of the user.

8. The device of claim 6, wherein said infrared signal receiver is an infrared photoreceptor.

9. The device of claim 6, wherein said reflected infrared energy is transmitted at a high energy audio frequency.

10. The device of claim 6, wherein said partly-reflected infrared energy is filtered using a band pass filter.

11. The device of claim 6, wherein said party-reflected infrared energy collected by said infrared signal receiver is digitized.

12. The device of claim 6, wherein said internal physiological process is a hemodynamic process.

13. A method of detecting a unique biometric marker for biometric identification comprising the steps of:

transmitting energy toward a user to measure a hemodynamic process, said energy being partly absorbed and partly reflected by said users body;

collecting a portion of said partly reflected energy;

processing said collected reflected energy to identify at least one trait of said hemodynamic process that is substantially unique to said user.

\* \* \* \* \*